(12) United States Patent
Aiyar et al.

(10) Patent No.: US 10,817,323 B2
(45) Date of Patent: Oct. 27, 2020

(54) SYSTEMS AND METHODS FOR ORGANIZING ON-DEMAND MIGRATION FROM PRIVATE CLUSTER TO PUBLIC CLOUD

(71) Applicant: Nutanix, Inc., San Jose, CA (US)

(72) Inventors: Srinivas Aiyar, Sammamish, WA (US); Ravi Sundaram, Boston, MA (US); Karan Gupta, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 137 days.

(21) Appl. No.: 15/884,686

(22) Filed: Jan. 31, 2018

(65) Prior Publication Data

US 2019/0235901 A1 Aug. 1, 2019

(51) Int. Cl.
*G06F 9/455* (2018.01)
*G06F 9/50* (2006.01)
*H04L 29/08* (2006.01)
*H04L 12/26* (2006.01)

(52) U.S. Cl.
CPC ........ *G06F 9/45558* (2013.01); *G06F 9/5072* (2013.01); *G06F 9/5083* (2013.01); *G06F 2009/4557* (2013.01); *G06F 2009/45595* (2013.01); *H04L 43/045* (2013.01); *H04L 67/10* (2013.01)

(58) Field of Classification Search
CPC ............... G06F 9/45558; G06F 9/5072; G06F 2009/4557; G06F 2009/45595; G06F 9/4856; G06F 9/5077; G06F 2009/45562; G06F 11/1484; G06F 2009/45579; G06F 9/45533; G06F 9/5083; G06F 2009/45587; G06F 9/50; H04L 67/10
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,789,043 B2 * | 7/2014 | Biran | G06F 9/45558 718/1 |
| 8,850,130 B1 | 9/2014 | Aron et al. | |
| 9,594,591 B2 * | 3/2017 | Bavishi | G06F 9/4856 |
| 9,727,363 B2 * | 8/2017 | Wang | G06F 9/4856 |
| 9,772,866 B1 | 9/2017 | Aron et al. | |
| 9,871,851 B2 * | 1/2018 | Todd | H04L 67/10 |
| 10,282,222 B2 * | 5/2019 | Thakkar | G06F 9/45558 |

(Continued)

OTHER PUBLICATIONS

Dieter Kratsch, Finding the minimum bandwidth of an interval graph, Information and Computation, vol. 74, Issue 2, 1987 (Year: 1987).*

(Continued)

*Primary Examiner* — Abu Zar Ghaffari
(74) *Attorney, Agent, or Firm* — Foley & Lardner LLP

(57) ABSTRACT

Systems and methods for migrating a plurality of virtual machines (VMs) from a private cluster to a public cloud include identifying the plurality of VMs currently residing in the private cluster to be migrated to the public cloud. A communication graph indicative of communications involving the plurality of VMs is determined. A migration sequence for the plurality of VMs based on the communication graph is generated. The plurality of VMs is migrated from the private cluster to the public cloud according to the migration sequence.

16 Claims, 6 Drawing Sheets

(56) References Cited

U.S. PATENT DOCUMENTS

| | | | | |
|---|---|---|---|---|
| 10,372,490 | B2* | 8/2019 | Ferris | G06F 9/5072 |
| 10,498,529 | B1* | 12/2019 | Hashmi | H04L 9/0827 |
| 2008/0155537 | A1* | 6/2008 | Dinda | H04L 67/101 |
| | | | | 718/1 |
| 2009/0265706 | A1* | 10/2009 | Golosovker | G06F 9/4856 |
| | | | | 718/1 |
| 2011/0023114 | A1* | 1/2011 | Diab | G06F 9/4856 |
| | | | | 726/22 |
| 2011/0197039 | A1* | 8/2011 | Green | G06F 3/0617 |
| | | | | 711/162 |
| 2012/0166644 | A1* | 6/2012 | Liu | G06F 9/4856 |
| | | | | 709/226 |
| 2012/0311568 | A1* | 12/2012 | Jansen | G06F 9/45558 |
| | | | | 718/1 |
| 2013/0031550 | A1* | 1/2013 | Choudhury | G06F 9/5033 |
| | | | | 718/1 |
| 2013/0073731 | A1* | 3/2013 | Bose | G06F 9/5088 |
| | | | | 709/226 |
| 2013/0086272 | A1* | 4/2013 | Chen | G06F 9/4856 |
| | | | | 709/226 |
| 2013/0097296 | A1* | 4/2013 | Gehrmann | G06F 9/4856 |
| | | | | 709/223 |
| 2013/0152076 | A1* | 6/2013 | Patel | G06F 9/45558 |
| | | | | 718/1 |
| 2013/0212578 | A1* | 8/2013 | Garg | H04L 41/0668 |
| | | | | 718/1 |
| 2014/0372533 | A1* | 12/2014 | Fu | G06F 9/5072 |
| | | | | 709/204 |
| 2015/0052517 | A1* | 2/2015 | Raghu | G06F 9/4856 |
| | | | | 718/1 |
| 2016/0055023 | A1 | 2/2016 | Ghosh et al. | |
| 2016/0057073 | A1* | 2/2016 | Steinder | H04L 47/72 |
| | | | | 709/226 |
| 2016/0094477 | A1* | 3/2016 | Bai | H04L 47/786 |
| | | | | 709/226 |
| 2016/0103699 | A1 | 4/2016 | Thakkar et al. | |
| 2016/0105378 | A1* | 4/2016 | Xia | H04L 41/0816 |
| | | | | 370/381 |
| 2016/0259662 | A1* | 9/2016 | Ghosh | G06F 9/45533 |
| 2016/0266919 | A1* | 9/2016 | Wang | G06F 9/45558 |
| 2016/0337480 | A1* | 11/2016 | Anerousis | G06F 9/45558 |
| 2016/0378524 | A1* | 12/2016 | Gough | G06F 9/45558 |
| | | | | 718/1 |
| 2017/0034018 | A1* | 2/2017 | Parandehgheibi | G06F 21/552 |
| 2017/0109212 | A1* | 4/2017 | Gaurav | G06F 9/45533 |
| 2017/0201569 | A1* | 7/2017 | Fu | H04L 67/34 |
| 2017/0371696 | A1* | 12/2017 | Prziborowski | G06F 9/45558 |
| 2018/0095776 | A1* | 4/2018 | Tsai | G06F 9/505 |
| 2018/0246751 | A1* | 8/2018 | Dong | G06F 9/505 |
| 2018/0307512 | A1* | 10/2018 | Balma | G06F 9/45558 |
| 2018/0367434 | A1* | 12/2018 | Kushmerick | H04L 43/14 |
| 2019/0158605 | A1* | 5/2019 | Markuze | H04L 12/4625 |

OTHER PUBLICATIONS

Poitras, Steven. "The Nutanix Bible" (Jan. 11, 2014), from stevenpoitras.com/the-nutanix-bible/ (Publication date based on indicated capture date by Archive.org; first publication date unknown).

Poitras, Steven. "The Nutanix Bible" (Jan. 12, 2016), from nutanixbible.com/.

Poitras, Steven. "The Nutanix Bible" (Oct. 15, 2013), from stevenpoitras.com/the-nutanix-bible/ (Publication date based on indicated capture date by Archive.org; first publication date unknown).

Poitras, Steven. "The Nutanix Bible" (Jun. 20, 2014), from tevenpoitras.com/the-nutanix-bible/ (Publication date based on indicated capture date by Archive.org; first publication date unknown).

Poitras, Steven. "The Nutanix Bible" (Jan. 3, 2017), from /nutanixbible.com/.

Poitras, Steven. "The Nutanix Bible" (Jan. 3, 2018), from nutanixbible.com/.

Poitras, Steven. "The Nutanix Bible" (Sep. 4, 2015), from /nutanixbible.com/.

Poitras, Steven. "The Nutanix Bible" (Jan. 7, 2015), from tevenpoitras.com/the-nutanix-bible/ (Publication date based on indicated capture date by Archive.org; first publication date unknown).

Poitras, Steven. "The Nutanix Bible" (Jun. 8, 2017), from /nutanixbible.com/.

Poitras, Steven. "The Nutanix Bible" (Jun. 9, 2015), from venpoitras.com/the-nutanix-bible/ (Publication date based on indicated capture date by Archive.org; first publication date unknown).

Poitras, Steven. "The Nutanix Bible" (Jun. 9, 2016), from /nutanixbible.com/.

Canali et al, "A Correlation-based Methodology to Infer Communication Patterns between Cloud Virtual Machines," Valuetools 2016, pp. 251-254 (4 pages).

Canali et al., "A Correlation-based Methodology to Infer Communication patterns between Cloud Virtual Machines," InfQ, Oct. 2016, pp. 1-16 (16 pages).

Cano, Ignacio, et al. "Curator: Self-Managing Storage for Enterprise Clusters" (Mar. 27, 2017), from //www.usenix.org/conference/nsdi17/.

Cello et al., "Traffic-Aware Clustering and VM Migration in Distributed Data Center," DDC 14, Aug. 2014, p. 41 (1 page).

Corneil et al., "The Ultimate Interval Graph Recognition Algorithm? (Extended Abstract)" Proceedings of the Ninth Annual ACM-SIAM Symposium on Discrete Algorithms, 2009, pp. 1-10 (10 pages).

Kratsch, Dieter, "Finding the Minimum Bandwidth of an Interval Graph," Information and Computation 74, 1987, pp. 140-158 (19 pages).

Mahesh et al., "On Finding the Minimum Bandwidth of Interval Graphs," Information and Computation 95, 1991, pp. 218-224 (7 pages).

Nocentino et al., "Toward Dependency-Aware Live Virtual Machine Migration," VTDC 09, Jun. 2009, pp. 59-66 (8 pages).

Wikipedia, "Graph bandwidth—Wikipedia," en.wikipedia.org/wiki/Graph_bandwidth, Mar. 9, 2020, 4 pages.

Wikipedia, "Interval Graph—Wikipedia," en.wikipedia.org/wiki/Interval_graph, Mar. 9, 2020, 6 pages.

\* cited by examiner

SYSTEMS AND METHODS FOR ORGANIZING ON-DEMAND MIGRATION FROM PRIVATE CLUSTER TO PUBLIC CLOUD

BACKGROUND

The following description is provided to assist the understanding of the reader. None of the information provided or references cited is admitted to be prior art.

Some virtual machines (VMs) may be required to migrate from a private, on-premise cluster to a public cloud for various reasons, including impending contingency situations, under-performance at the private cluster, planned outage, and the like. Such migration may be needed to maintain performance of the private cluster as a whole. However, in a situation in which some VMs have already migrated to the public cloud while other VMs in communication with those migrated VMs remain in the private cluster, the communication links between the migrated VMs and the VMs still residing in the private cluster can stretch over the wide area network (WAN) from the public cloud to the private cluster. This increases latency between a private node provisioning a VM remaining in the private cluster and a public node provisioning a VM residing in the public cloud, and thus producing a commensurate reduction in joint processing of the private node and the public node.

SUMMARY

In accordance with at least some aspects of the present disclosure, a method for migrating a plurality of VMs from a private cluster to a public cloud includes identifying the plurality of VMs currently residing in the private cluster to be migrated to the public cloud, determining a communication graph indicative of communications involving the plurality of VMs, determining a migration sequence for the plurality of VMs based on the communication graph, and migrating the plurality of VMs from the private cluster to the public cloud according to the migration sequence.

In accordance with some aspects of the present disclosure, a migration server for migrating a plurality of VMs from a private cluster to a public cloud includes a processing unit having a processor and a memory. The processing unit is configured to identify the plurality of VMs currently residing in the private cluster to be migrated to the public cloud. The processing unit further determines a communication graph indicative of communications involving the plurality of VMs, determines a migration sequence for the plurality of VMs based on the communication graph, and migrates the plurality of VMs from the private cluster to the public cloud according to the migration sequence.

In accordance with some aspects of the present disclosure, a non-transitory computer readable media includes computer-executable instructions embodied thereon that, when executed by a processor of a migration server, cause the migration server to perform a process for migrating a plurality of VMs from a private cluster to a public cloud, including identifying the plurality of VMs currently residing in the private cluster to be migrated to the public cloud, determining a communication graph indicative of communications involving the plurality of VMs, determining a migration sequence for the plurality of VMs based on the communication graph, and migrating the plurality of VMs from the private cluster to the public cloud according to the migration sequence.

The foregoing summary is illustrative only and is not intended to be in any way limiting. In addition to the illustrative aspects, implementations, and features described above, further aspects, implementations, and features will become apparent by reference to the following drawings and the detailed description.

Figure 1:
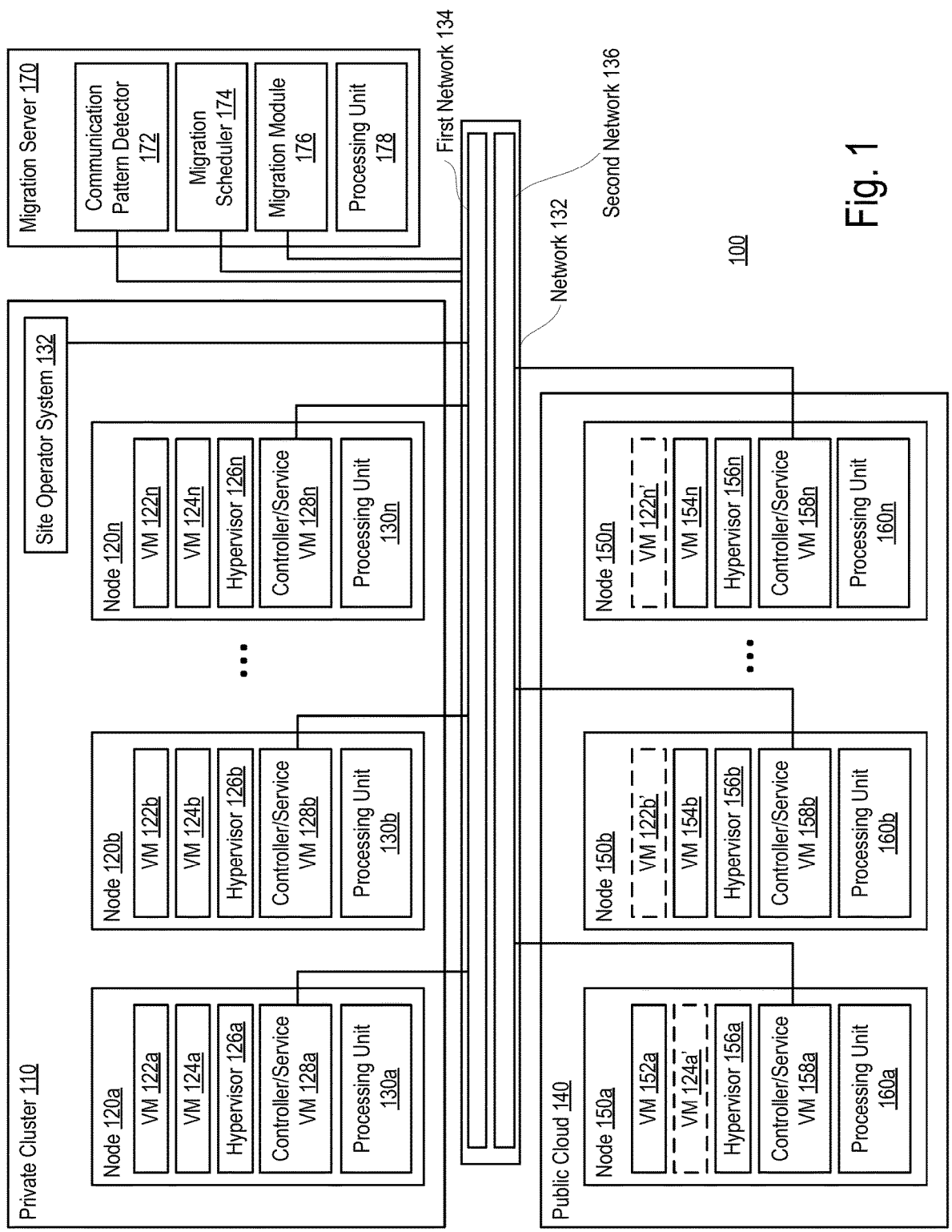
FIG. 1 is a block diagram of a system including a migration server, in accordance with some implementations of the present disclosure.

The foregoing and other features of the present disclosure will become apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Implementations described herein relate to a scheme for migrating VMs from a private cluster to a public cloud. The VMs migrated to the public cloud from the private cluster may be a subset of all VMs in the private cluster in some examples. In other examples, all VMs in the private cluster may be migrated from the private cluster to the public cloud. Various reasons exist for migrating VMs from a private cluster to a public cloud. Such reasons include but are not limited to, planned outage, performance, and insurance.

With respect to planned outage, a private cluster may be hosted on a premise of an enterprise customer who may not have invested in live maintenance facilities due to a lack of scale and resources. Thus, the enterprise customer may have to bring the private cluster down for maintenance and/or updates. An example of maintenance includes replacing circuit breakers. An example of updates includes installing a heating, ventilation, and air conditioning (HVAC) system of larger capacity. In such situations, at least some or all of the VMs in the private cluster are required to be temporarily moved out of the private cluster to a public cloud to avoid disruption of service to clients of the enterprise customer. The migrated VMs can be moved back to the private cluster after maintenance and/or upgrades are completed.

With respect to performance, a workload of the private cluster may increase over time. In some situations, the workload of the private cluster may increase dramatically due to a flash crowd event being triggered. For example, a private cluster that had been sized for normal workloads may be underperforming during seasonal workload spikes. Alternately, some private nodes may have degraded or failed, leading to unacceptable performance and potential failure to fulfill Service Level Agreements (SLAs). To address such issues, some or all VMs may be migrated to a public cloud, which may possess sufficient processing capacities to fulfill the performance requirements.

Insurance relates to a variety of contingency situations such as but not limited to, storms or electrical outages. The contingency situations can cause backup systems (such as but not limited to, an uninterruptible power supply (UPS) system) to be activated at a private cluster. Such backup systems typically have short lifespans and can support services only for a duration within which the main systems are expected to recover. In some implementations, an infrastructure insurance mechanism that involves automatic detection of such contingency situations in which backup systems have been activated and triggering failover of the private cluster to the public cloud.

Regardless of the manner in which migration from a private cluster to a public cloud is triggered, in order or sequence according which the VMs residing in the private cluster are migrated can affect latency. For instance, during the migration process, some VMs may have already been migrated to the public cloud while other VMs are currently remaining in the private cluster. The communications between the migrated VMs and the VMs remaining in the private cluster may be subject to increased latency because the communication links between the migrated VMs and the VMs remaining in the private cluster may stretch across the WAN, from the public cloud to the private cluster, introducing additional network hops that delay communications.

Implementations described herein address such issues by determining a migration sequence, which is an order by which some or all VMs residing in a private cluster are migrated to a public cloud. In some implementations, a migration server (e.g., a failover system) can profile communications within the private cluster and determine a pattern of communication among the VMs within the private cluster. In some examples, a site operator system managing the private cluster can provide affinity requirements indicative of communication relationships among the VMs within the private cluster. In some implementations, the migration server can monitor the private cluster for migration triggers, such as but not limited to planned outage, degraded performance, and contingency situations. Responsive to detecting a migration trigger, the migration server can determine a subset of the VMs within the private cluster to move to the public cloud. The subset is selected to improve the overall performance of the private cluster. In other situations, all VMs within the private cluster can be moved to the public cloud. The migration server accounts for overhead (especially latency) imposed on communications among the VMs already migrated and the VMs currently remaining in the private cluster. Live connections may be migrated to the public cloud via suitable proxies or virtual private networks (VPNs), for example, using forwarding stubs residing in the private cluster. After the event associated with the migration trigger has passed, the migrated VMs can be migrated back to the private cluster.

Referring now to FIG. 1, an example block diagram of a system 100 is shown, in accordance with some implementations of the present disclosure. The system 100 includes a private cluster 110, which can be a data center that supports VMs 122a-122n and 124a-124n for one or more clients (not shown). Services commensurate with the VMs 122a-122n and 124a-124n can be provided to the clients under respective SLAs, which may specify performance requirements. In that regard, the private cluster 110 includes a plurality of nodes, such as nodes 120a, 120b, . . . , 120n for provisioning the VMs 122a-122n and 124a-124n. The private cluster 110 may be hosted on a premise of an enterprise customer in some cases. The enterprise customer may maintain and upgrade the nodes 120a-120n.

The nodes 120a-120n may be referred to as private nodes, given that the nodes 120a-120n reside in the private cluster 110. In some implementations, each of the nodes 120a-120n may be a hardware device such as but is not limited to a server. For example, one or more of the nodes 120a-120n may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other examples, one or more of the nodes 120a-120n may be another type of device that is suitable for use as a node within the private cluster 110.

Each of the nodes 120a-120n includes at least one VM (e.g., VMs 122a-122n and 124a-124n), a hypervisor (e.g., hypervisors 126a-126n), a controller/service VM (e.g., controller/service VMs 128a-128n), and a processing unit (e.g., processing units 130a-130n). In particular, the node 120a includes VMs 122a and 124a, a hypervisor 126a, a controller/service VM 128a, and a processing unit 130a. The node 120b, includes VMs 122b and 124b, a hypervisor 126b, a controller/service VM 128b, and a processing unit 130b. The node 120n includes VMs 122n and 124n, a hypervisor 126n, a controller/service VM 128n, and a processing unit 130n.

Each of the VMs 122a-122n and 124a-124n is a software-based implementation of a computing machine provided by the private cluster 110. The VMs 122a-122n and 124a-124n emulate the functionality of a physical computer. Specifically, the hardware resources, such as processing unit, memory, storage, etc., of the underlying computer (e.g., the nodes 120a) are virtualized or transformed by a hypervisor (e.g., the hypervisor 126a) into the underlying support for each of the VMs (e.g., the VMs 122a and 124a) that may run its own operating system (OS) and applications on the underlying physical resources similar to an actual computer. By encapsulating an entire machine, including CPU, memory, operating system, storage devices, and network devices, the VMs 122a-122n and 124a-124n are compatible with most standard OSs (e.g. Windows, Linux, etc.), applications, and device drivers.

The VMs 122a-122n and 124a-124n may be managed by the hypervisors 126a-126n. Each of the hypervisors 126a-126n is a virtual machine monitor that allows a single physical server computer to run multiple instances of VMs.

For example, the node 120a can run the VMs 122a and 124a. The VMs 122a and 124a share the resources of that one physical server computer (the node 120a, including the processing unit 130a), potentially across multiple environments. By running the plurality of VMs on each of the nodes 120a-120n, multiple workloads and multiple OSs may be run on a single piece of underlying hardware computer to increase resource utilization and manage workflow.

The VMs 122a-122n and 124a-124n are also controlled and managed by the controller/service VMs 128a-128n. The controller/service VMs 128a-128n are configured to communicate with each other via a first network 134 to form a distributed system. The hypervisors 126a-126n may be configured to run virtualization software such as but not limited to, ESXi from VMWare, AHV from Nutanix, Inc., XenServer from Citrix Systems, Inc., etc., for running the VMs 122a-122n and 124a-124n and for managing the interactions among the VMs 122a-122n and 124a-124n and the underlying hardware of the nodes 120a-120n. The controller/service VMs 128a-128n and the hypervisors 126a-126n may be configured as suitable for use within the private cluster 110.

The controller/service VMs 128a-128n are configured to manage, route, and otherwise handle workflow requests to and from the VMs 122a-122n and 124a-124n. For example, the controller/service VM 128a is configured to manage, route, and otherwise handle workflow requests to and from the VMs 122a and 124a. The controller/service VMs 128a-128n are connected to a network (e.g., the first network 134) to facilitate communications among the nodes 120a-120n, and thus to facilitate communications among the VMs 122a-122n and 124a-124n. Although not shown, in some implementations, the hypervisors 126a-126n may also be connected to the first network 134.

The first network 134 may include one or more of a cellular network, Wi-Fi, Wi-Max, ZigBee, Bluetooth, a proprietary network, Ethernet, one or more twisted pair wires, coaxial cables, fiber optic cables, local area networks, Universal Serial Bus ("USB"), Thunderbolt, or any other type of wired or wireless network, or a combination thereof. The first network 134 may be structured to permit the exchange of data, instructions, messages, or other information among the nodes 120a-120n (e.g., among the controller/service VMs 128a-128n and/or among the hypervisors 126a-126n).

Each of the nodes 120a-120n may be configured to communicate and share resources with each other via the first network 134. For example, the nodes 120a-120n may communicate and share resources with each other via a respective controller/service VM and/or a respective hypervisor. One or more of the nodes 120a-120n may also be organized in a variety of network topologies, and each of the nodes 120a-120n may be termed as a "host" or "host machine." In that regard, the first network 134 may be any suitable private or local network associated with the private cluster 110 for local exchange of data. Given that the first network 134 is a local network, less latency may be experienced by the nodes 120a-120n when communicating via the first network 134. The latency increases if another network or additional networks/hops are needed to maintain communications.

Each of the nodes 120a-120n may include one or more processing units 130a-130n, respectively, configured to execute instructions. The instructions may be carried out by a special purpose computer, logic circuits, or hardware circuits of the nodes 120a-120n. The processing units 130a-130n may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 130a-130n, thus, execute an instruction, meaning that they perform the operations called for by that instruction. The VMs 122a-122n and 124a-124n, the hypervisors 126a-126n, and the controller/service VM 128a-128n can be implemented with the processing units 160a-160n.

A site operator system 132 refers to a system or server within the private cluster 110 configured to monitor various aspects of the private cluster 110. For example, the site operator system 132 may monitor communication links (exchange of data) among the VMs 122a-122n and 124a-124n in real time to determine communication relationships among the VMs 122a-122n and 124a-124n. In some examples, the site operator system 132 can provide affinity requirements indicative of communication relationships among the VMs 122a-122n and 124a-124n within the private cluster 110. The site operator system 132 may be operatively coupled to the controller/service VM 128a-128n and/or the hypervisors 126a-126n for receiving such information. The site operator system 132 may be located within the same premise as that of the private cluster 110. In some implementations, the site operator system 132 may send the communication relationships to a migration server 170 for building a communication graph in the manner described. In other implementations, the migration server 170 may not be allowed to access the communication relationships.

In some implementations, the site operator system 132 may monitor performance level of the VMs 122a-122n and 124a-124n to determine whether one or more of the VMs 122a-122n and 124a-124n and/or the entire private cluster 110 are underperforming. In some implementations, the site operator system 132 may determine a planned outage or an occurrence of a contingency situation automatically or based on operator input. In some implementations, the site operator system 132 may send the performance level, planned outage, and/or occurrence of a contingency situation the migration server 170 for triggering the migration in the manner described.

The system 100 includes a public cloud 140. The public cloud 140 may be a cloud-based data center can supports VMs such as but not limited to VMs 152a, 124a', 122b', 154b, . . . , 122n', and 154n. The public cloud 140 includes additional or alternative processing power for the private cluster 110. In that regard, the public cloud 140 includes a plurality of nodes, such as nodes 150a, 150b, . . . , 150n for provisioning the VMs 152a, 124a', 122b', 154b, . . . , 122n', and 154n. The public cloud 140 may be hosted anywhere on the cloud, not on a premise of an enterprise customer. The cloud manager may maintain and upgrade the nodes 150a-150n.

The nodes 150a-150n may be referred to as public nodes, given that the nodes 150a-150n reside in the public cloud 140. In some implementations, each of the nodes 150a-150n may be a hardware device such as but is not limited to a server. For example, one or more of the nodes 150a-150n may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other examples, one or more of the nodes 150a-150n may be another type of device that is suitable for use as a node within the public cloud 140.

Each of the nodes 150a-150n includes at least one VM (e.g., VMs 152a, 124a', 122b', 154b, ..., 122n', and 154n), a hypervisor (e.g., hypervisors 156a-156n), a controller/service VM (e.g., controller/service VMs 158a-158n), and a processing unit (e.g., processing units 160a-160n). In particular, the node 150a includes VMs 152a and 124a', a hypervisor 156a, a controller/service VM 158a, and a processing unit 160a. The node 150b, includes VMs 122b', 154b, a hypervisor 156b, a controller/service VM 158b, and a processing unit 160b. The node 150n includes VMs 122n' and 154n, a hypervisor 156n, a controller/service VM 158n, and a processing unit 160n.

Each of the VMs 152a, 124a', 122b', 154b, ..., 122n', and 154n is a software-based implementation of a computing machine provided by the public cloud 140. The VMs 152a, 124a', 122b', 154b, ..., 122n', and 154n emulate the functionality of a physical computer. Specifically, the hardware resources, such as processing unit, memory, storage, etc., of the underlying computer (e.g., the nodes 150a) are virtualized or transformed by a hypervisor (e.g., the hypervisor 156a) into the underlying support for each of the VMs (e.g., the VMs 152a and 124a') that may run its own OS and applications on the underlying physical resources similar to an actual computer. By encapsulating an entire machine, including CPU, memory, operating system, storage devices, and network devices, the VMs 152a, 124a', 122b', 154b, ..., 122n', and 154n are compatible with most standard OSs, applications, and device drivers.

The VMs 152a, 124a', 122b', 154b, ..., 122n', and 154n may be managed by the hypervisors 156a-156n. Each of the hypervisors 156a-156n is a virtual machine monitor that allows a single physical server computer to run multiple instances of VMs. For example, the node 150a can run the VMs 152a and 124a'. The VMs 152a and 124a' share the resources of that one physical server computer (the node 150a, including the processing unit 160a), potentially across multiple environments. By running the plurality of VMs on each of the nodes 150a-150n, multiple workloads and multiple OSs may be run on a single piece of underlying hardware computer to increase resource utilization and manage workflow.

The VMs 152a, 124a', 122b', 154b, ..., 122n', and 154n are also controlled and managed by the controller/service VMs 158a-158n. The controller/service VMs 158a-158n are configured to communicate with each other via a second network 136 to form a distributed system. The hypervisors 156a-156n may be configured to run virtualization software such as but not limited to, ESXi from VMWare, AHV from Nutanix, Inc., XenServer from Citrix Systems, Inc., etc., for running the VMs 152a, 124a', 122b', 154b, ..., 122n', and 154n and for managing the interactions among the VMs 152a, 124a', 122b', 154b, ..., 122n', and 154n and the underlying hardware of the nodes 150a-150n. The controller/service VMs 158a-158n and the hypervisors 156a-156n may be configured as suitable for use within the public cloud 140.

The controller/service VMs 158a-158n are configured to manage, route, and otherwise handle workflow requests to and from the VMs 152a, 124a', 122b', 154b, ..., 122n', and 154n. For example, the controller/service VM 158a is configured to manage, route, and otherwise handle workflow requests to and from the VMs 152a and 124a'. The controller/service VMs 158a-158n are connected to a network (e.g., the second network 136) to facilitate communications among the nodes 150a-150n, and thus to facilitate communications among the VMs 152a, 124a', 122b', 154b, ..., 122n', and 154n. Although not shown, in some implementations, the hypervisors 156a-156n may also be connected to the second network 136.

The second network 136 may include one or more of a cellular network, Wi-Fi, Wi-Max, ZigBee, Bluetooth, a proprietary network, Ethernet, one or more twisted pair wires, coaxial cables, fiber optic cables, local area networks, USB, Thunderbolt, or any other type of wired or wireless network, or a combination thereof. The second network 136 may be structured to permit the exchange of data, instructions, messages, or other information among the nodes 150a-150n (e.g., among the controller/service VMs 158a-158n and/or among the hypervisors 156a-156n). Each of the nodes 150a-150n may be configured to communicate and share resources with each other via the second network 136. For example, the nodes 150a-150n may communicate and share resources with each other via a respective controller/service VM and/or a respective hypervisor. One or more of the nodes 150a-150n may also be organized in a variety of network topologies, and each of the nodes 150a-150n may be termed as a "host" or "host machine." In that regard, the second network 136 may be any suitable private or local network associated with the public cloud 140 for local exchange of data. Given that the second network 136 is a local network, less latency may be experienced by the nodes 150a-150n when communicating via the second network 136. The latency increases if another network or additional networks/hops are needed to maintain communications.

Each of the nodes 150a-150n may include one or more processing units 160a-160n, respectively, configured to execute instructions. The instructions may be carried out by a special purpose computer, logic circuits, or hardware circuits of the nodes 160a-160n. The processing units 160a-160n may be implemented in hardware, firmware, software, or any combination thereof. The processing units 160a-160n, thus, execute an instruction, meaning that they perform the operations called for by that instruction. The VMs 152a, 124a', 122b', 154b, ..., 122n', and 154n, the hypervisors 156a-156n, and the controller/service VM 158a-158n can be implemented with the processing units 160a-160n.

Some VMs may be migrated from the private cluster 110 to the public cloud 140. For example, the VM 124a may be migrated from the private cluster 110 (as supported by the node 120a) to the public cloud 140 to become the VM 124a', which is supported by the node 150a. The VM 122b may be migrated from the private cluster 110 (as supported by the node 120b) to the public cloud 140 to become the VM 122b', which is supported by the node 150b. The VM 122n may be migrated from the private cluster 110 (as supported by the node 120n) to the public cloud 140 to become the VM 122a', which is supported by the node 150a.

After migration, the VMs 124a', 122b', and 122n' may maintain communication links with one or more of the VMs in the private cluster 110. For example, the VMs 124a', 122b', and 122n' may exchange significant amount of information with the VMs still in the private cluster 110. To enable such communications, a VM (e.g., the VM 122a) in the private cluster 110 may need to communicate with one or more of the VMs 124a', 122b', and 122n' via the network 132. In that regard, the network 132 may be a wide area network (WAN). Communicating via the network 132 may be associated with increased latency as compared to communicating via the first network 134 or communication via the second network 136.

Although the network 132 is shown to include the first network 134 and the second network 136, FIG. 1 is intended to show that for a VM in the private cluster 110 to communication with a migrated VM on the public cloud 140, the network 132 associated with the increased latency is used instead of or in addition to local network 134 or 136. In that regard, the network 132 can be a different network than either the first network 134 or the second network 136, such that communications between a VM in the private cluster 110 and a VM in the public cloud 140 involves only the network 132. The network 132 may include more network hops than either network 134 or 136, which may be one of the causes for increased latency.

The migration server 170 is configured migration VMs from the private cluster 110 to the public cloud 140. In some implementations, the migration server 170 may be or include a failover system that migrates VMs to the public cloud 140 responsive to determining or otherwise receiving a migration trigger. The migration server 170 includes a communication pattern detector 172, a migration scheduler 174, a migration module 176, and a processing unit 178.

The processing unit 178 may be implemented in hardware, firmware, software, or any combination thereof to execute instructions. The instructions may be written using one or more programming language, scripting language, assembly language, etc. The processing unit 178, thus, executes an instruction, meaning that the processing unit 178 may perform the operations called for by that instruction. The communication pattern detector 172, the migration scheduler 174, and the migration module 176 can be implemented with the processing unit 178.

In some implementations, the communication pattern detector 172 generates a communication graph indicative of communications among the VMs 122a-122n and 124a-124n in the private cluster 110. The communication pattern detector 172 may receive data indicative of the communication relationships among the VMs 122a-122n and 124a-124n from the site operator system 132 in some arrangements. The communication pattern detector 172 may be coupled to the first network 134 or the network 132 for receiving such data. Although the communication pattern detector 172 is shown to be outside of the private cluster 110, the communication pattern detector 172 may be located within the private cluster 110 or on the premise on which the private cluster 110 is supported. In that regard, the communication pattern detector 172 may be or include the site operator system 132. Using the data indicative of the communication relationships among the VMs 122a-122n and 124a-124n, the communication pattern detector 172 can generate a communication graph (e.g., a communication graph 200 shown FIG. 2) in the manner described.

In other implementations, the private cluster 110 may not explicitly support the communication pattern detector 172. For example, the site operator system 132 may not send the data indicative of communications among the VMs 122a-122n and 124a-124n in the private cluster 110. Thus, the communication pattern detector 172 may not be able to have knowledge of the communications among the VMs 122a-122n and 124a-124n in the private cluster 110. In such situations, the communication pattern detector 172 can monitor the communications between VMs (e.g., the VM 124a') already migrated to the public cloud 140 and VMs (e.g., the VM 122a) remaining in the private cluster what will be moved to the public cloud 140 to determine collected trace of communications. Based on the collected trace, the communication pattern detector 172 can generate a communication graph (e.g., a communication graph 400 shown FIG. 4) in the manner described.

The migration module 176 facilitates migration of the VMs from the private cluster 110 to the public cloud 140. For example, the migration module 176 can copy or at least facilitate copying of OS states associated with the VMs 124a, 122b, and 122n from associated private nodes 120a, 120b, and 120n that provision the VMs 124a, 122b, and 122n to public nodes 150a, 150b, and 150n, respectively. With respect to live connections, the migration module 176 can facilitate migration live connection on the VMs 124a, 122b, and 122n via at least one of proxies and virtual private networks (VPNs) based on forwarding stubs residing in the private cluster 110. The migration module 176 may be connected to the network 132 for such operations.

Figure 2:
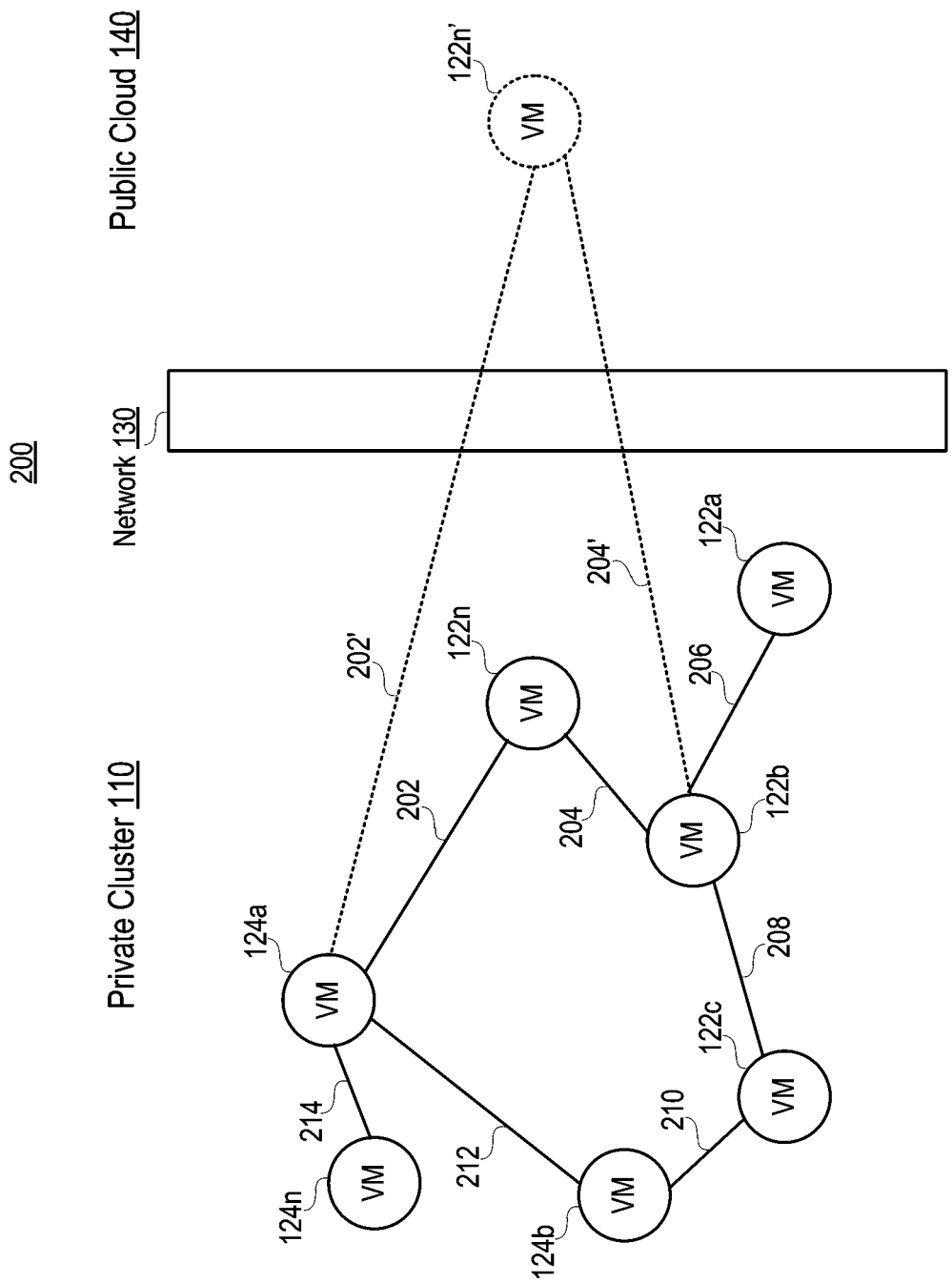
FIG. 2 is a diagram illustrating a communication graph, in accordance with some implementations of the present disclosure.

FIG. 2 is a diagram illustrating a communication graph 200, in accordance with some implementations of the present disclosure. Referring to FIGS. 1-2, the communication graph 200 can be generated by the communication pattern detector 172 based on the communications among the VMs 122a-122n and 124a-124n in the private cluster 110. To achieve this, the communication pattern detector 172 itself or the site operator system 132 monitors communication links (exchange of data) among the VMs 122a-122n and 124a-124n in real time. Communication relationships and/or affinity requirements between the VMs 122a-122n and 124a-124n can be mapped out based on the detected communication links. In other words, the communication graph 200 can be used when the private cluster 110 offers explicitly system support to provide or at least to allow collection of the communication pattern/relationships among the VMs 122a-122n and 124a-124n when still residing in the private cluster 110. This corresponds to a deterministic approach in determining the migration sequence. The communication graph 200 can be generated before any VMs are moved to the public cloud 140 in some examples. The communication graph 200 may be an undirected graph with vertices representing VMs and edges representing communication links between the VMs.

As shown, each of the VMs 122a, 124a, 122b, 124b, 122n, and 124n can be represented in the communication graph 200 as a vertex. Edges 202, 204, 206, 208, 210, 212, and 214 represent the communication links. The communication links may correspond to active exchange of data among the VMs 122a, 124a, 122b, 124b, 122n, and 124n. The communication graph 200 can be built before a very first VM (e.g., the VM 122n) is migrated to the public cloud 140 (e.g., to become VM 122n'). Once the VM 122n is migrated to the public cloud 140, the post-migration communication links 202' and 204' cross the network 130 to maintain the connection between the VM 122n' and the VM 124a, and to maintain the connections between the VM 122n' and the VM 122b. As described, crossing the network 130 introduces additional latency to the joint processing for the VM 122n' and VMs (such as but not limited to, the VMs 124a and 122b) in the private cluster 110.

Based on the communication graph 200 produced by the communication pattern detector 172, the migration scheduler 174 can determine the migration sequence or order. In some implementations, the migration scheduler 174 determines a numbering associated with vertices in the communication graph 200. For example, the migration scheduler 174 may assign a number to each vertex on a side of the private cluster 110 in the communication graph 200. In some instances, the number can be a number within 1 and j, where 1 represents the very first VM (e.g., the VM 122n) to be migrated to the public cloud 140, and j represents the jth VM to be migrated to the public cloud 140. The migration sequence may be determined to minimize a maximum slowdown of any of the edges 202, 204, 206, 208, 210, 212, and 214.

In some implementations, a bandwidth of the communication graph 200 can be determined by the migration scheduler 174. For example, the bandwidth of the communication graph 200 can be determined using the following expression:

$$\text{Min}_{numberings\_f} \text{Max}_{edges\_e=(u,v)} |f(u)-f(v)| \quad (1)$$

Expression (1) minimizes a quantity max ($\text{Max}_{edges\_e=(u,v)}$) of the edges |f(u)–f(v)|, such that a longest edge within the communication graph 200 is minimized. In some instances, f:V→[1, 2, . . . , n] is the migration sequence, such that if f(u)=j, u corresponds to the vertex that is the jth vertex to be migrated over to the public cloud 140.

In some arrangements, computing the bandwidth of the communication graph 200 and the corresponding numbering (the migration sequence) is in general nondeterministic polynomial time (NP)-complete. In addition, other efficient algorithms exist for various special cases associated with the communication graph 200. For example, the communication graph 200 may be an interval graph that is an intersection graph of family of intervals. The interval graph may capture distribution systems that involve stream processing. An efficient algorithm used for an interval graph may be disclosed in Dieter Kratsch, Finding the minimum bandwidth of an interval graph, Information and Computation, Volume 74, Issue 2, 1987, which is incorporated by reference in its entirety.

Figure 3:
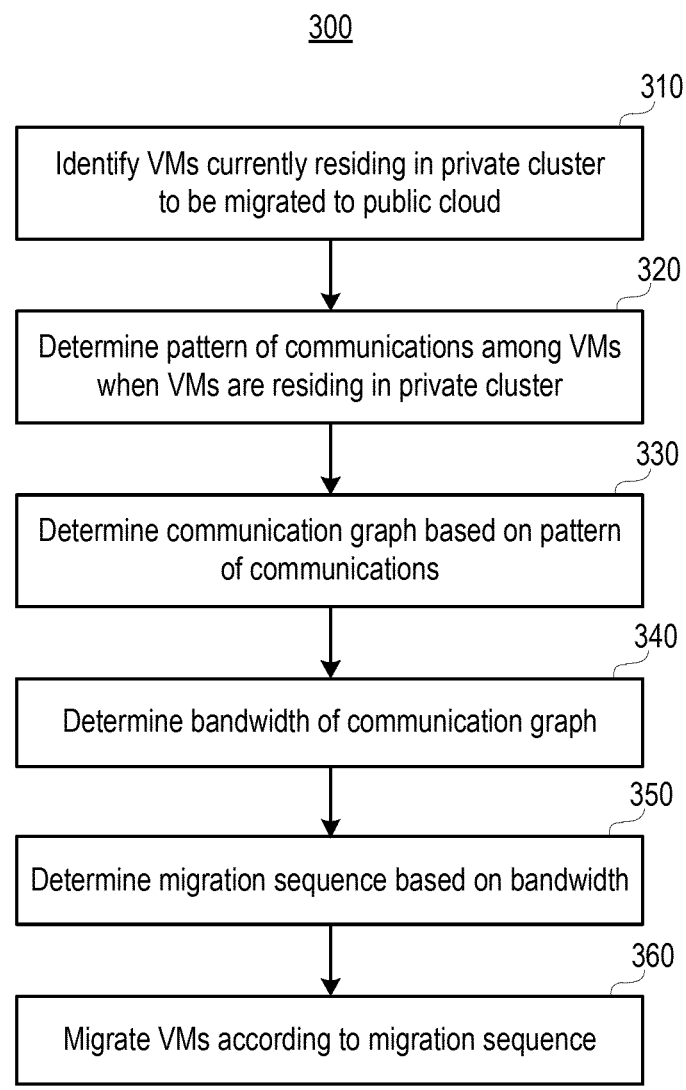
FIG. 3 is a flowchart outlining operations for migrating a plurality of VMs from a private cluster to a public cloud, in accordance with some implementations of the present disclosure.

FIG. 3 is a flowchart outlining a method 300 for migrating a plurality of VMs from the private cluster 110 (FIGS. 1 and 2) to the public cloud 140 (FIGS. 1 and 2), in accordance with some implementations of the present disclosure. Additional, fewer, or different operations may be performed in the method depending on the embodiment. Referring to FIGS. 1-3, the method 300 includes determination of the migration sequence based on the communication graph 200. The method 300 can be used when the private cluster 110 (e.g., the site operator system 132) offers explicitly system support to provide or at least to allow collection of the communication pattern/relationships among the VMs 122a-122n and 124a-124n when still residing in the private cluster 110.

At 310, VMs currently residing in the private cluster 110 may be identified to be migrated to the public cloud 140. For example, the site operator system 132 may monitor migration triggers, such as but not limited to planned outage, degraded performance, and contingency situations. The site operator system 132 can determine a subset of the VMs within the private cluster 110 to move to the public cloud 140. The subset is selected to improve the overall performance of the private cluster 110 via any suitable methods.

At 320, the communication pattern detector 172 determines the pattern of communications among the VMs when the VMs are residing in the private cluster 110. At 330, the communication pattern detector 172 determines a communication graph (e.g., the communication graph 200) based on the pattern of communications.

At 340, the migration scheduler 174 determines a bandwidth of the communication graph. For example, the bandwidth of the communication graph can be determined using expression (1). In the context of special types of graphs (e.g., the interval graph), an efficient algorithm disclosed herein can be used to determine the bandwidth. The numbering associated with vertices representing the VMs to be migrated can be determined.

At 350, the migration scheduler 174 determines the migration sequence based on the bandwidth (and the numbering associated thereof). In some arrangements, the migration sequence may correspond to the numbering of the vertices in the communication graph. At 360, the VMs represented as vertices in the communication graph is migrated according to the migration sequence. The migration module 176 can facilitate the migration in the manner described.

Figure 4:
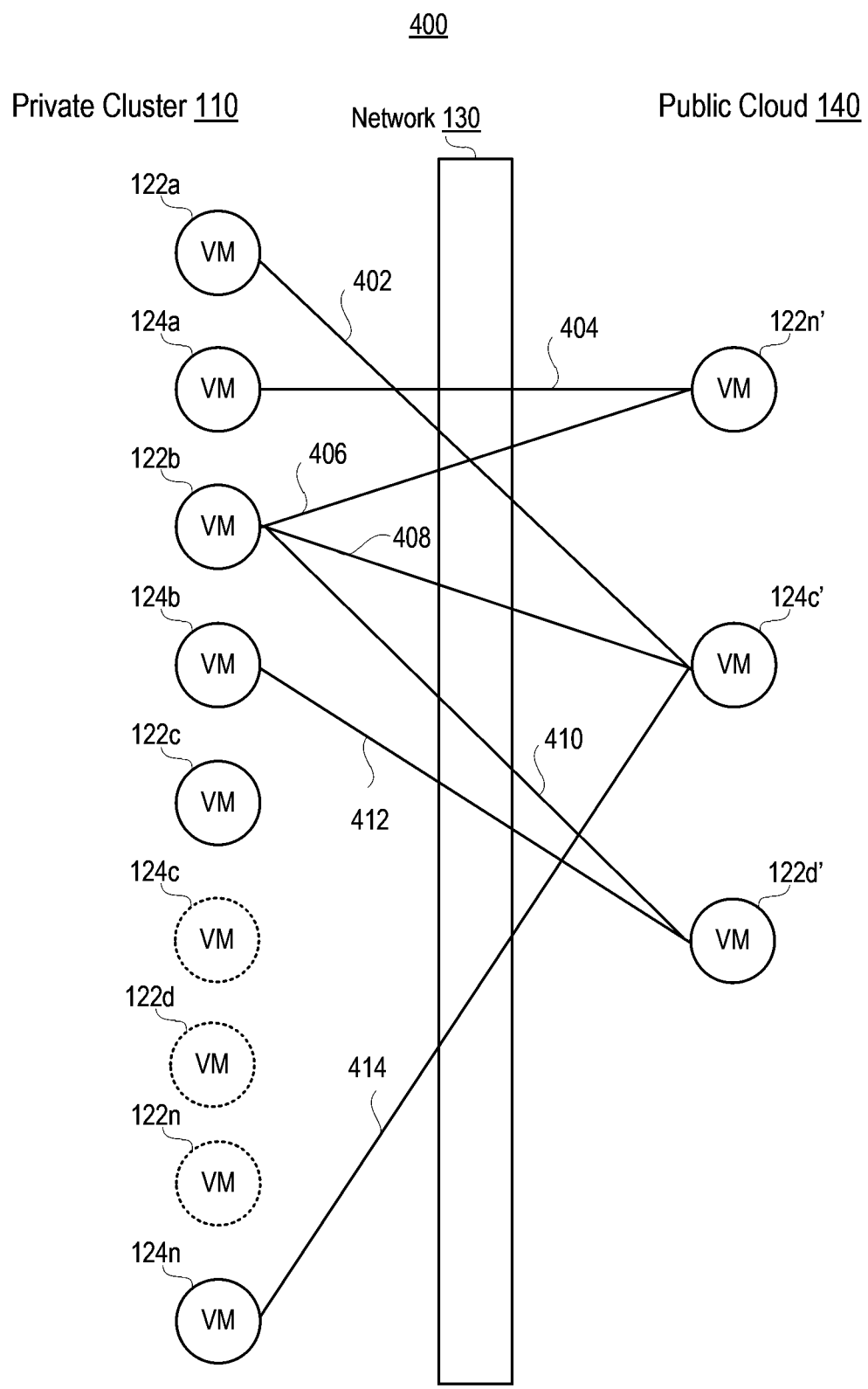
FIG. 4 is a diagram illustrating a communication graph, in accordance with some implementations of the present disclosure.

FIG. 4 is a diagram illustrating a communication graph 400, in accordance with some implementations of the present disclosure. Referring to FIGS. 1-4, the communication graph 400 can be generated by the communication pattern detector 172 based on collected trace associated with communications between VMs already migrated to the public cloud 140 and VMs currently residing in the private cluster 110. The communication graph 400 can be used when the private cluster 110 does not offer explicitly system support to provide or at least to allow collection of the communication pattern/relationships among the VMs 122a-122n and 124a-124n when still residing in the private cluster 110. The communication graph 400 corresponds to a dynamic and randomized approach in determining the migration sequence.

The communication graph 400 can be generated after at least one VM is migrated to the public cloud 140 in some examples. For instance, after the VM 122n (VM 122n' in the public cloud 140), the VM 124c (VM 124c' in the public cloud 140), and the VM 122n (VM 122n' in the public cloud 140) have been migrated over to the public cloud 140, the communication pattern detector 172 detects the collected trace corresponding to communication links between VMs (122n', 124c, and 122d') already migrated to the public cloud 140 and VMs (122a, 124a, 122b, 124b, 122c, and 124n) that remain in the private cluster 110. Given that every time another VM is migrated to the public cloud 140, the communication graph 400 may change, the communication graph 400 may be determined dynamically. In that regard, every time one or more VMs have been migrated to the public cloud 140, the communication pattern detector 172 determines another communication graph based on newly revealed collected traces between the VMs already migrated to the public cloud 140 and VMs that remain in the private cluster 110. As such, the communication graph 400 may be generated at any intermediate stage of migration.

The communication graph 400 may be an undirected graph with vertices representing VMs and edges representing communication links between the VMs. As shown, each of the VMs 122a, 124a, 122b, 124b, 122c, and 124n in the private cluster 110 can be represented in the communication graph 400 as a vertex. Each of the VMs 122n', 124c', and 122d' in the public cluster 140 can be represented in the communication graph 400 as a vertex. Edges 402-414 represent the communication links. The communication links may correspond to active exchange of data between the VMs 122a, 124a, 122b, 124b, 122c, and 124n in the private cluster 110 and the VMs 122n', 124c', and 122d' in the public cluster 140. As described, crossing the network 130 introduces additional latency.

The communication graph 400 may be a bipartite graph indicative of communications between a first set and a second set. The first set includes the VMs 122a, 124a, 122b, 124b, 122c, and 124n residing in the private cluster 110. The second set includes the migrated VM VMs 122n', 124c', and 122d' residing on the public cloud 140.

Based on the communication graph 400 produced by the communication pattern detector 172, the migration scheduler 174 can determine the migration sequence or order. In some implementations, the migration scheduler 174 determines a degree or weight associated with vertices on the side of the private cluster 110 in the communication graph 400. The degree is commensurate with a number of communication links that the VM has with a VM in the public cloud 140. For example, the degree for a vertex corresponding to each of VMs 122a, 124a, 124b, and 124n is 1. The degree for the vertex corresponding to VM 122b is 3. The migration scheduler 174 may select a next VM to migrate to the public cloud 140 with a probability commensurate with the degree. For example, the migration scheduler 174 can select the VM 122b to be the next VM to be migrated to the public cloud 140 given that the VM 122b has the highest degree among all VMs in the private cluster 110. Typically, higher degree corresponds to a higher probability that the associated VM is to be migrated next.

Figure 5:
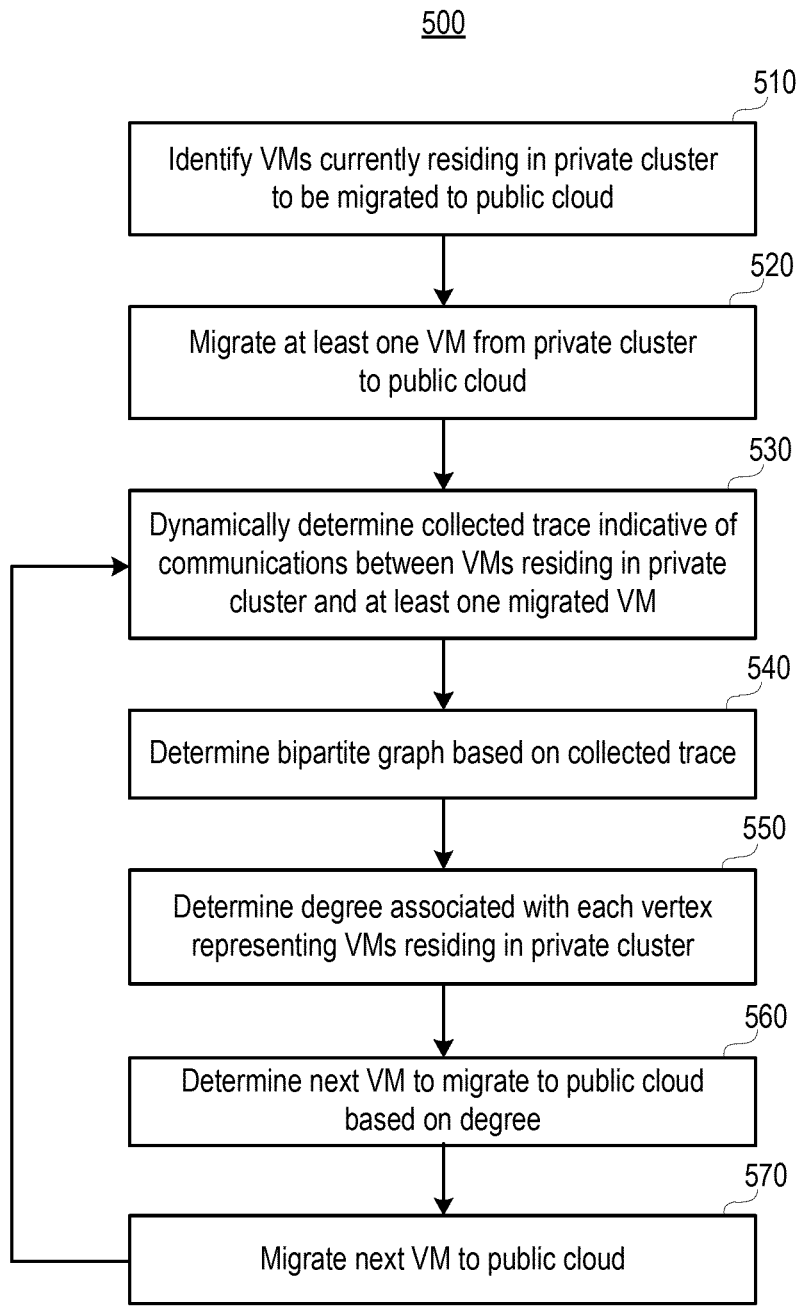
FIG. 5 is a flowchart outlining operations for migrating a plurality of VMs from a private cluster to a public cloud, in accordance with some implementations of the present disclosure.

FIG. 5 is a flowchart outlining a method 500 for migrating a plurality of VMs from the private cluster 110 (FIGS. 1 and 2) to the public cloud 140 (FIGS. 1 and 2), in accordance with some implementations of the present disclosure. Additional, fewer, or different operations may be performed in the method depending on the embodiment. Referring to FIGS. 1-5, the method 500 includes determination of the migration sequence based on the communication graph 400. The method 500 can be used when the private cluster 110 (e.g., the site operator system 132) does not offer explicitly system support to provide or at least to allow collection of the communication pattern/relationships among the VMs when still residing in the private cluster 110.

At 510, VMs currently residing in the private cluster 110 may be identified to be migrated to the public cloud 140. For example, the site operator system 132 may monitor migration triggers, such as but not limited to planned outage, degraded performance, and contingency situations. The site operator system 132 can determine a subset of the VMs within the private cluster 110 to move to the public cloud 140. The subset is selected to improve the overall performance of the private cluster 110 via any suitable methods.

At 520, the migration module 176 may migrate at least one VM from the private cluster 110 to the public cloud 140, when no VM has been migrated to the public cloud 140 yet. The at least one VM may be selected at random at this initial stage, because the collected traces indicative of the communication links between VMs residing in the private cluster 110 and the VMs residing in the public cloud 140 can only be detected once at least one VM has been migrated to the public cloud 140. In the example shown in FIG. 4, the VMs 122n, 124c and 122d may be first migrated to the public cloud 140 at random.

At 530, the communication pattern detector 172 dynamically determines collected trace indicative of communications between VMs residing the private cluster 110 and at least one migrated VMs currently residing in the public cloud 140. At 540, the communication pattern detector 172 determines a bipartite graph (e.g., the communication graph 400) based on the collected trace.

At 550, the migration scheduler 174 determines a degree associated with each vertex representing VMs residing in the private cluster 110. At 560, the migration scheduler 174 determines at least one next VM to migrate to the public cloud 140 based on the degree. As described, the VM(s) with the highest degree in the communication graph 400 may be the next VM(s) to be migrated to the public cloud 140. At 570, the migration module 176 migrates the next VM to the public cloud 140.

After the next VM (e.g., the VM 122b) has been migrated to the public cloud 140, new collected traces related to the communication links (not shown) between the recently migrated VM 122b and other VMs in the private cluster 110 can be detected by the communication pattern detector 172. In that regard, the method 500 returns to 530 in which those new collected traces are determined. Based on the new collected traces, another bipartite graph can be determined at 540.

Figure 6:
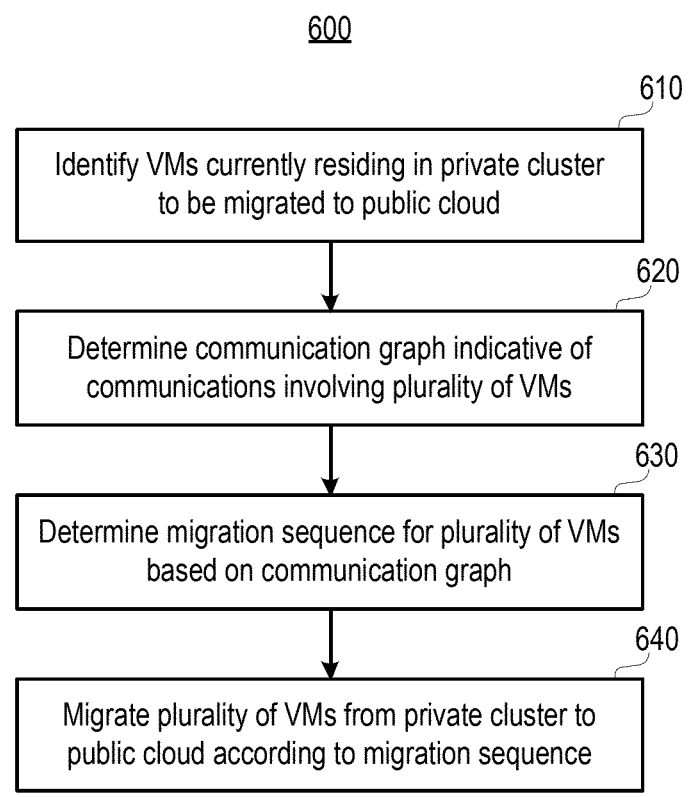
FIG. 6 is a flowchart outlining operations for migrating a plurality of VMs from a private cluster to a public cloud, in accordance with some implementations of the present disclosure.

FIG. 6 is a flowchart outlining a method 600 for migrating a plurality of VMs from the private cluster 110 (FIGS. 1 and 2) to the public cloud 140 (FIGS. 1 and 2), in accordance with some implementations of the present disclosure. Additional, fewer, or different operations may be performed in the method depending on the embodiment. Referring to FIGS. 1-6, the method 600 encompasses both the deterministic approach (e.g., FIGS. 2 and 3) and the randomized approach (e.g., FIGS. 4-5).

At 610, the site operator system 132 determines the plurality of VMs currently residing in the private cluster 110 to be migrated to the public cloud 140. The plurality of VMs is identified to be migrated to the public cloud 140 based on at least one of planned outage at the private cluster affecting private nodes provisioning the plurality of VMs, underperformance of the private nodes provisioning the plurality of VMs, and backup for the private nodes provisioning the plurality of VMs. Such situations may be collectively referred to as migration triggers.

At 620, the communication pattern detector 172 determines a communication graph indicative of communications involving the plurality of VMs. The communication graph (e.g., the communication graph 200 or 400) may be an undirected graph comprising vertices representing the plurality of the VMs and edges representing the communications among the plurality of VMs.

With respect to the deterministic approach, the communication graph (e.g., the communication graph 200) indicates the communications among the plurality of VMs when the plurality of VMs is residing in the private cluster 110. The communication graph 200 is determined by monitoring a pattern of communications among the plurality of VMs when the plurality of VMs is residing in the private cluster 110. In some implementations, the communication graph 200 is determined based on affinity requirements among the plurality of VMs when the plurality of VMs is residing in the private cluster 110.

With respect to the randomized approach, the communication graph (e.g., the communication graph 400) indicates the communication links among the plurality of VMs residing in the private cluster 110 and at least one migrated VM residing on the public cloud 140. The communication graph may be a bipartite graph indicative of communications between a first set and a second set. The first set includes the plurality of VMs residing in the private cluster 110. The second set includes the at least one migrated VM residing on the public cloud 140.

At 630, the migration scheduler 164 determines a migration sequence for the plurality of VMs based on the communication graph. In the deterministic approach, the migration sequence is determined to minimize a maximum slowdown of any edge in the communication graph 200. In that regard, a bandwidth and corresponding numbering of vertices on the side of the private cluster 110 in the communication graph 200 can be determined based on the communication graph 200. In the randomized approach, the degree for each vertex on the side of the private cluster 110 can be used as a basis for determining the migration sequence (e.g., one or more next VMs to migrate).

At 640, the migration module 176 may migrate the plurality of VMs from the private cluster 110 to the public cloud 140 according to the migration sequence. The method 600 may further include determining, by the site operator system 132 that an event associated with the migration trigger has passed. The migration module 176 migrates the migrated VMs back to the private cluster 110. In other examples, at least some of the migrated VMs may remain in the public cloud 140 beyond the event associated with the migration trigger has passed, sometimes permanently.

It is also to be understood that in some implementations, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A non-transitory computer readable media including computer-executable instructions embodied thereon that, when executed by a processor of a migration server, cause the migration server to perform a process comprising:
  monitoring for a migration trigger update requiring a plurality of virtual machines (VMs) currently residing in a private cluster to be migrated to a public cloud;
  detecting communication between the plurality of VMs in the private cluster and a first virtual machine (VM) in the public cloud;
  identifying, for each of the plurality of VMs in the private cluster, a number of communication connections each VM has with the first VM in the public cloud;
  upon detecting the migration trigger,
    determining a sequence for migrating the plurality of VMs from the private cluster to the public cloud, wherein the sequence orders each VM in the private cluster according to a descending number of communication connections with the first VM from highest to lowest; and migrating the plurality of VMs from the private cluster to the public cloud according to the sequence, wherein the sequence for migrating the plurality of VMs minimizes a longest edge of a communication graph and minimizes a quantity $\text{Max}_{edges\_e=(u,v)}$ of edges $|f(u)-f(v)|$ according to:

$$\text{Min}_{numberings\_f}\text{Max}_{edges\_e=(u,v)}|f(u)-f(v)|$$

where the communication graph includes vertices (u and v) representing VMs and edges ($|f(u)-f(v)|$) representing communication connections among the VMs, and $\text{Min}_{numberings\_f}$ represents minimizing the longest edge, $\text{Max}_{edges\_e=(u,v)}$.

2. The medium of claim 1, wherein a communication graph is indicative of the traffic between the virtual machines.

3. The medium of claim 2, wherein the sequence is configured to minimize a latency associated with an edge in the communication graph.

4. The medium of claim 2, wherein the sequence may correspond to a sequential numbering of vertices in the communication graph.

5. The medium of claim 2, wherein the communication graph may be determined using a deterministic approach or a randomized approach.

6. A migration server comprising a processing unit having a processor and a memory, wherein the processing unit has programmed instructions to:
monitor for a migration trigger update requiring a plurality of virtual machines (VMs) currently residing in a private cluster to be migrated to a public cloud;
detect communication between the plurality of VMs in the private cluster and a first virtual machine (VM) in the public cloud;
identify, for each of the plurality of VMs in the private cluster, a number of communication connections each VM has with the first VM in the public cloud;
upon detecting the migration trigger, determine a sequence for migrating the plurality of virtual machines from the private cluster to the public cloud, wherein the sequence orders each virtual machine (VM) in the private cluster according to a descending number of communication connections with a first VM in the public cloud from highest to lowest; and
migrate the plurality of virtual machines one by one to the public cloud in accordance with the sequence, wherein the sequence for migrating the plurality of VMs minimizes a longest edge of a communication graph and minimizes a quantity $\text{Max}_{edges\_e=(u,v)}$ of edges $|f(u)-f(v)|$ according to:

$$\text{Min}_{numberings\_f}\text{Max}_{edges\_e=(u,v)}|f(u)-f(v)|$$

where the communication graph includes vertices (u and v) representing VMs and edges ($|f(u)-f(v)|$) representing communication connections among the VMs, and $\text{Min}_{numberings\_f}$ represents minimizing the longest edge, $\text{Max}_{edges\_e=(u,v)}$.

7. The migration server of claim 6, the processing unit having further programmed instructions to determine collected trace indicative of connections between first virtual machines in the private cluster and second virtual machines in the public cloud.

8. The migration server of claim 6, wherein the sequence is configured to minimize a latency associated with an edge in the communication graph.

9. The migration server of claim 6, the processing unit having further programmed instructions to copy operating system states associated with the plurality of virtual machines from the private cluster to the public cloud.

10. The migration server of claim 6, the processing unit having further programmed instructions to migrate a live connection on at least one of the plurality of virtual machines via proxies or virtual private networks based on forwarding stubs residing in the private cluster.

11. A method comprising:
monitoring for a migration trigger update requiring a plurality of virtual machines (VMs) currently residing in a private cluster to be migrated to a public cloud;
detecting communication between the plurality of VMs in the private cluster and a first virtual machine (VM) in the public cloud;
identifying, for each of the plurality of VMs in the private cluster, a number of communication connections each VM has with the first VM in the public cloud;
upon detecting the migration trigger, determining a sequence for migrating the plurality of VMs from the private cluster to the public cloud, wherein the sequence orders each VM in the private cluster according to a descending number of communication connections with the first VM from highest to lowest; and
migrating the plurality of VMs from the private cluster to the public cloud according to the sequence, wherein the sequence for migrating the plurality of VMs minimizes a longest edge of a communication graph according to:

$$\text{Min}_{numberings\_f}\text{Max}_{edges\_e=(u,v)}|f(u)-f(v)|$$

where the communication graph includes vertices (u and v) representing VMs and edges ($|f(u)-f(v)|$) representing communication connections among the VMs, and $\text{Min}_{numberings\_f}$ represents minimizing the longest edge, $\text{Max}_{edges\_e=(u,v)}$.

12. The method of claim 11, further comprising selecting a second virtual machine at random to migrate to the public cloud.

13. The method of claim 11, further comprising determining collected traces indicative of the communication connections between the plurality of VMs.

14. The method of claim 13, further comprising generating a graph indicative of the collected traces.

15. The method of claim 11, further comprising copying operating system states associated with the plurality of virtual machines from the private cluster to the public cloud.

16. The method of claim 11, further comprising migrating a live connection on at least one of the plurality of virtual machines via proxies or virtual private networks based on forwarding stubs residing in the private cluster.

* * * * *